United States Patent
Penland et al.

(10) Patent No.: US 10,457,860 B2
(45) Date of Patent: Oct. 29, 2019

(54) SELF SUSPENDING PROPPANTS WITH BRINE TOLERANCE FOR HYDRAULIC FRACTURING

(71) Applicant: S.P.C.M. SA, Andrézieux-Bouthéon (FR)

(72) Inventors: James H. Penland, Port Wentworth, GA (US); W. Kurt Hammesfahr, Richmond Hill, GA (US); Jordan Davis, Jesup, GA (US)

(73) Assignee: S.P.C.M. SA, Andrézieux-Bouthéon (FR)

( * ) Notice: Subject to any disclaimer, the term of this patent is extended or adjusted under 35 U.S.C. 154(b) by 65 days.

(21) Appl. No.: 15/286,164

(22) Filed: Oct. 5, 2016

(65) Prior Publication Data

US 2018/0094187 A1    Apr. 5, 2018

(51) Int. Cl.
  *C09K 8/80*   (2006.01)
  *C09K 8/66*   (2006.01)

(52) U.S. Cl.
  CPC ............. *C09K 8/805* (2013.01); *C09K 8/665* (2013.01)

(58) Field of Classification Search
  None
  See application file for complete search history.

(56) References Cited

U.S. PATENT DOCUMENTS

| | | | |
|---|---|---|---|
| 2013/0180714 A1* | 7/2013 | Nevin | E21B 37/00 166/280.1 |
| 2014/0060832 A1 | 3/2014 | Mahoney et al. | |
| 2015/0005204 A1* | 1/2015 | Alwattari | C04B 28/02 507/211 |
| 2016/0137904 A1* | 5/2016 | Drake | C09K 8/536 507/219 |

OTHER PUBLICATIONS

Goldstein, B., & VanZeeland, A. (Sep. 28, 2015). Self-Suspending Proppant Transport Technology Increases Stimulated Reservoir Volume and Reduces Proppant Pack and Formation Damage. Society of Petroleum Engineers. doi:10.2118/174867-MS.

* cited by examiner

*Primary Examiner* — John J Figueroa
(74) *Attorney, Agent, or Firm* — B. Aaron Schulman, Esq.; Stites & Harbison, PLLC

(57) ABSTRACT

The present invention relates to a proppant coated with:
  at least one water-soluble and/or water-swellable polymers; and
  at least one composition comprising at least one sequestering agent;
the sequestering agent being in the layer of water soluble and/or water-swellable polymer and/or in another layer.
The invention also relates to the use of this proppant for hydraulic fracturing and especially when the hydraulic fracturing fluid comprises divalent cations in a proportion equal or greater to 0.1 weight %.

14 Claims, 6 Drawing Sheets

SELF SUSPENDING PROPPANTS WITH BRINE TOLERANCE FOR HYDRAULIC FRACTURING

TECHNICAL FIELD OF THE INVENTION

The application relates to providing improved self-suspending proppants for hydraulic fracturing that are brine tolerant.

BACKGROUND

In the process of acquiring oil and/or gas from a well, it is often necessary to stimulate the flow of hydrocarbons via hydraulic fracturing. The term "fracturing" refers to the method of pumping a fluid into a well until the pressure increases to a level that is sufficient to fracture the subterranean geological formations containing the entrapped materials. This process results in cracks and breaks that disrupt the underlying layer to allow the hydrocarbon product to be carried to the well bore at a significantly higher rate. However, unless the pressure is maintained, the newly formed openings close. In order to open a path and maintain it, a propping agent or "proppant" can be injected along with the hydraulic fluid to create the support needed to preserve the opening. As the fissure is formed, the proppants are delivered in a slurry where, upon release of the hydraulic pressure, they form a pack or a prop that serves to hold open the fractures.

Typical fracturing fluids contain around 1-6 pounds of proppant per US gallon of fracturing fluid (ppa), but can be as high as 10 ppa. The most common types of proppants are grains of silica sand (raw or resin-coated) and man-made (engineered) ceramic material.

The proppant that has to be used in a formation depends on many factors. Proppants have to deal with high pressures, temperatures and fluids especially water (fresh and brine), oil and gas. The ideal propping agent is strong, resistant to crushing, resistant to corrosion, has a low density, and is readily available at low cost. The products that best meet these desired traits are silica sand, resin-coated sand (RCS), and ceramic proppants.

Silica sand is the most commonly used proppant as it is much less expensive per pound than RCS and ceramic proppants.

Self-suspending proppants have been developed (US20140060832) to allow the particles to go deeper into the fracture, further increasing the production capabilities. Simplistically, these proppants are sand particles coated with hydratable polymer. When the polymer hydrates it decreases the overall density of the proppant particle and becomes a self-suspending proppant. In turn, the self-suspending proppant is able to flow farther into the fracture without settling out.

Technical Problem Solving

However, these self-suspending proppants are used in fresh water applications but not in brines solution comprising divalent cations. In the presence of small amounts of divalent cations, the polymer is unable to properly uncoil and the performance of the self-suspending proppant is severely diminished. In documents (SPE 174867-MS, 2015), the calcium tolerance limit is noted at 625 ppm (as $CaCO_3$) and the magnesium tolerance is noted at 790 ppm (as $CaCO_3$). In order for self-suspended proppant to perform in such brines divalent cations must be sequestered from the solution without creating any additional problems in the well.

A sequestering agent can be added in the fracturing fluid, but it creates formation of insoluble precipitates which potentially can plug fractures.

There is thus a need to provide modified self-suspending proppants which can be used in brines solution comprising divalent cation.

An objective of the present invention is to provide a modified self-suspending proppants that can be used in brines solution comprising divalent cation.

Another objective of the present invention is to provide a process for the preparation of these modified proppants.

Other objectives will appear in the following description of the application.

DESCRIPTION OF THE INVENTION

To improve tolerance to divalent cations and to avoid problems mentioned previously, the applicant has incorporated a sequestering agent inside the proppant coating.

The object of the invention is a self-suspending proppant comprising at least in one layer of coating at least one sequestering agent.

In the present invention a self-suspending proppant is a proppant which is covered by at least one layer of a water-soluble and/or water-swellable polymer.

Accordingly, a first object of the present invention is a proppant coated with:
- at least one water-soluble and/or water-swellable polymers; and
- at least one composition comprising at least one sequestering agent;

the sequestering agent being in the layer of water soluble and/or water-swellable polymer and/or in another layer.

The proppant thus obtained is a self-suspending proppant. Advantageously, this self-suspending proppant is brine-tolerant.

The invention also relates to a process for obtaining these brine-tolerant self-suspending proppants and the use of these brine tolerant self-suspending proppants for hydraulic fracturing especially when the fracturing fluid contains more than 0.1 weight % of divalent cations.

According to the invention:
- a "water-soluble polymer" is a polymer or copolymer which gives a solution without insoluble particles when it is dissolved under agitation at 25° C. and with a 50 g/L concentration in water.
- a "water-swellable polymer" is a polymer or copolymer which swells and thickens solution when it is put in water at 25° C.;
- a sequestering agent is a chemical substance that removes ions from a solution by entrapment into a ring without implementing chemical reaction.

Polymers used for the invention can be linear, structured or cross-linked. The term structured polymers relates to polymers in branched, star or comb form. Branched polymers are classically not linear polymers and comprise lateral chains. Cross-linked polymers are classically not linear polymers and are under a tri-dimensional array form, insoluble in water, but which swell in water.

The types of water-soluble and/or water-swellable polymers suitable for polymer coating of the self-suspending proppant according to the present invention broadly include non-ionic, anionic and cationic polymers. Advantageously, polymers are anionic with more than 10 mol % of anionic monomers.

Water-soluble and/or water-swellable polymers according to the invention are preferably homopolymers or copolymers of water soluble monomers (or their salts) which can be chosen from the following list: acrylic acid, methacrylic acid, acrylamide, methacrylamide, and their derivatives, carboxyethyl acrylate, hydroxyethylmethacrylate (HEMA), hydroxyethylacrylate (HEA), polyethyleneglycol acrylates (PEG-acrylates), N-isopropylacrylamide (NiPA), 2-acrylamido-2-methyl-1-propanesulfonic acid (AMPS), styrene sulfonic acid, vinylsulphonic acid, (meth)allylsulphonic acid, vinylphosphonic acid, N-vinylacetamide, N-methyl-N-vinylacetamide, N-vinylformamide, N-methyl-N-vinylformamide, N-vinylpyrrolidone, N-butyrolactam or N-vinylcaprolactam, maleic anhydride, itaconic acid, vinyl acetate, dimethyldiallylammonium chloride; quaternized dimethylaminoethyl meth acrylate (DMAEMA), (meth)acrylamidopropyltrimethy-ammonium chloride ((M)APTAC), methylvinylimidazolium chloride; 2-vinylpyridine; 4-vinylpyridine, and the like, and mixtures thereof.

The water-soluble and/or water-swellable polymer according to the invention can also be chosen in the following list: carboxymethyl cellulose, hydroxyethyl cellulose, hydroxypropyl cellulose, guar gum, carboxymethyl guar, carboxymethyl hydroxypropyl guar gum To obtain branched polymers or cross-linked polymers, monomers with more than one polymerizable group can be used. Examples of these monomers are: pentaerythritol triallyl ether, PEG-diacrylates and metahcrylates, N,N'-methylenebisacrylamide, epichlorohydrin, divinyl sulfone, and glycidyl methacrylate.

The molecular weight of water-soluble polymers according to the invention the invention can range from 1 to 30 million daltons. In a preferred embodiment, the water soluble (co)polymer preferably exhibits a molecular weight in the range of 5-30 million, more preferably in the range of 10 to 25 million daltons.

The proppant according to the invention is preferably chosen between silica sand, resin-coated sand (RCS), and ceramic proppants. Preferably the proppant of the invention is a silica sand.

Preferably, for the self-suspending proppant of the invention, the content of water-soluble and/or water-swellable polymer coating is comprised between 0.25 to 3 weight percent of proppant and more preferably between 0.5 to 2 weight percent of proppant.

In a preferred embodiment, the content of sequestering agent is comprised between 0.1 and 15 weight percent of proppant, more preferably between 0.5 and 10 weight percent of proppant.

Preferably, the sequestering agent of the invention is chosen among citrate of alkali metal, and mixtures thereof. More preferably, the sequestering agent according to the invention is chosen among trisodium citrate or potassium citrate or mixtures thereof.

Another preferred sequestering agent according to the invention is gluconate of alkali metal. More preferably, the sequestering agent is sodium gluconate.

In a preferred embodiment, the self-suspending proppant of the invention further comprises at least a binder layer on the surface of the proppant.

Glycerol, glycol, and other polyols are examples of specific binder according to the invention.

Advantageously, the amount of binder applied on the surface of the proppant is comprised between 0.1 and 0.75% by weight of the final self-suspending proppant.

According to a preferred embodiment, the present invention relates to a proppant coated with at least one layer of at least one composition comprising water-soluble and/or water-swellable polymers and at least one sequestering agent. In this embodiment, the proppant can also be coated by a layer of a binder composition. The water-soluble and/or water-swellable polymers, the sequestering agent and the binder are as disclosed above. In this embodiment, the binder layer can also comprise at least one sequestering agent. In this embodiment, the proppant can also comprise a further layer of at least one composition comprising at least one sequestering agent.

According to another preferred embodiment, the present invention relates to a proppant coated with:
  at least one layer of at least one water-soluble and/or water-swellable polymers; and
  at least one layer of at least one composition comprising at least one sequestering agent.

In this embodiment, the proppant can also be coated by a layer of a binder composition. The water-soluble and/or water-swellable polymers, the sequestering agent and the binder are as disclosed above. In this embodiment, the binder layer and/or the layer of at least one water-soluble and/or water-swellable polymers can also comprise at least one sequestering agent.

According to another preferred embodiment, the present invention relates to a proppant coated with:
  at least one layer of a binder composition comprising at least one sequestering agent; and
  at least one layer of at least one water-soluble and/or water-swellable polymers.

The water-soluble and/or water-swellable polymers, the sequestering agent and the binder are as disclosed above. In this embodiment, the layer of at least one water-soluble and/or water-swellable polymer can also comprise at least one sequestering agent. In this embodiment, the proppant can also comprise a further layer of at least one composition comprising at least one sequestering agent.

The composition comprising the sequestering agent, which is not the water-soluble and/or water-swellable polymer, can be any layer generally used in self-suspending proppant as for example an anti-friction layer or an anti-attrition layer.

The invention also deals with a process to obtain a self-suspending proppant according to the invention comprising at least the steps of:
1) providing a proppant;
2) optionally applying at least one layer of a composition comprising at least one binder and optionally comprising at least one sequestering agent;
3) applying at least one layer of a composition comprising at least one water-soluble and/or water-swellable polymer and optionally a sequestering agent;
4) optionally, especially if no sequestering agent is comprised in the binder layer or in the layer of water-soluble and/or water-swellable polymer, applying a layer of at least one composition comprising at least one sequestering agent. Steps 3 and 4 can be repeated and can be carried out in any order.

The composition comprising the sequestering agent, which is not the water-soluble and/or water-swellable polymer, can be any layer generally used in self-suspending proppant as for example an anti-friction layer or an anti-attrition layer.

Preferably, the application of the layer of the composition of water-soluble and/or water-swellable polymer is performed with a polymer in powder form or in water in oil emulsion form or a combination thereof.

Preferably, the sequestering agent is applied in powder form, in solution or in the form of an emulsion or a combination thereof.

In a preferred embodiment, a drying step 5) is performed at the end of the process of the invention.

For example, the drying step can be performed by any method known by the skilled person, for example by placing proppant in an oven.

Another aspect of the invention is the use of the previously described self-suspending proppants according to the invention in hydraulic fracturing fluids. Preferably, the invention relates to the use of the self-suspending proppant according to the invention in hydraulic fracturing fluids comprising divalent cations, especially in an amount greater or equal to 0.1% weight.

Preferably, divalent cations in these hydraulic fracturing fluids are calcium or magnesium salts.

Advantageously, the use of the self-suspending proppant according to the invention enables to keep the fractures, from the fracturation process with an hydraulic fracturation fluid, open, even when the hydraulic fracturation fluid comprises divalent cation. The invention thus relates to the use of the self-suspending proppant according to the invention to keep the fractures, from the fracturation process with an hydraulic fracturation fluid, open, even preferably when the hydraulic fracturation fluid comprises divalent cation.

The present invention also relates to a hydraulic fracturing fluid comprising a self-suspending proppants according of the invention. Preferably, this hydraulic fracturing fluid comprises divalent cations in a proportion equal or greater to 0.1 weight %. The content of the self-suspending proppant according to the invention is comprised between 1 and 6 pounds of proppant per US gallon of fracturing fluid (ppa).

The present invention also relates to a process for hydraulic fracturing comprising the use of a self-suspending proppants according to the invention. Advantageously, the use of the self-suspending proppants according to the invention enables to keep the fractures open. Preferably, the process according to the invention is carried out with hydraulic fracturing fluid comprising divalent cations in a proportion equal or greater to 0.1 weight %. The content of the self-suspending proppant according to the invention is comprised between 1 and 6 pounds of proppant per US gallon of fracturing fluid (ppa).

In further examples, a process of the invention to obtain self-suspending proppant in which a sequestering agent is incorporated in water-soluble or water swellable coating and use of these self-suspending proppants in hydraulic fracturing fluid with high divalent cations content are described. These examples highlight that self-suspending proppant of the invention improve the suspension characteristic of the proppant even in the presence of divalent cations.

EXAMPLE 1: COATING PROCESS OF SELF-SUSPENDING PROPPANT

Figure 1:
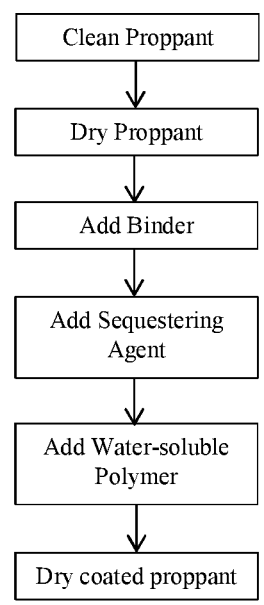
FIG. 1 represents a schematic view of a process for the preparation of a self-suspending proppant according to the invention.

The self-suspending proppants of the below examples are obtained based on the process described in FIG. 1, wherein the sequestering agent is added in the polymer layer.

After drying, self-suspending proppant was crushed and allowed to cool before use.

In the following examples, the standard performance testing protocol used is as follows: Place 200 ml of brine into a 600 ml griffin beaker. Begin mixing at 350 rpm using a paddle mixer. Add 120 grams of proppant to the brine and continue mixing for three minutes. Pour the contents of the beaker into a 250 mL graduated cylinder and start a timer. Measure the sand height at 5, 10, 15, 20, 30, 45, and 60 minutes.

Use the following formula to get the Total Proppant Suspension (in %).

$$\text{Proppant Suspension, \%} = \frac{(\text{Sand Bed Volume, mL} - 40)}{200}$$

The uncoated proppant will occupy approximately 40 mL of volume, and the maximum sand bed volume is approximately 240 mL. For this reason, 0% suspension is assumed to be at a level of 40 mL.

When interpreting the results, increased proppant suspension over time is indicative of better performance.

EXAMPLE 2: EFFECT OF TRISODIUM CITRATE CONCENTRATION IN SELF-SUSPENDING PROPPANT

For following figures, the proppant was coated with polymer using the previously described method.

Figure 2:
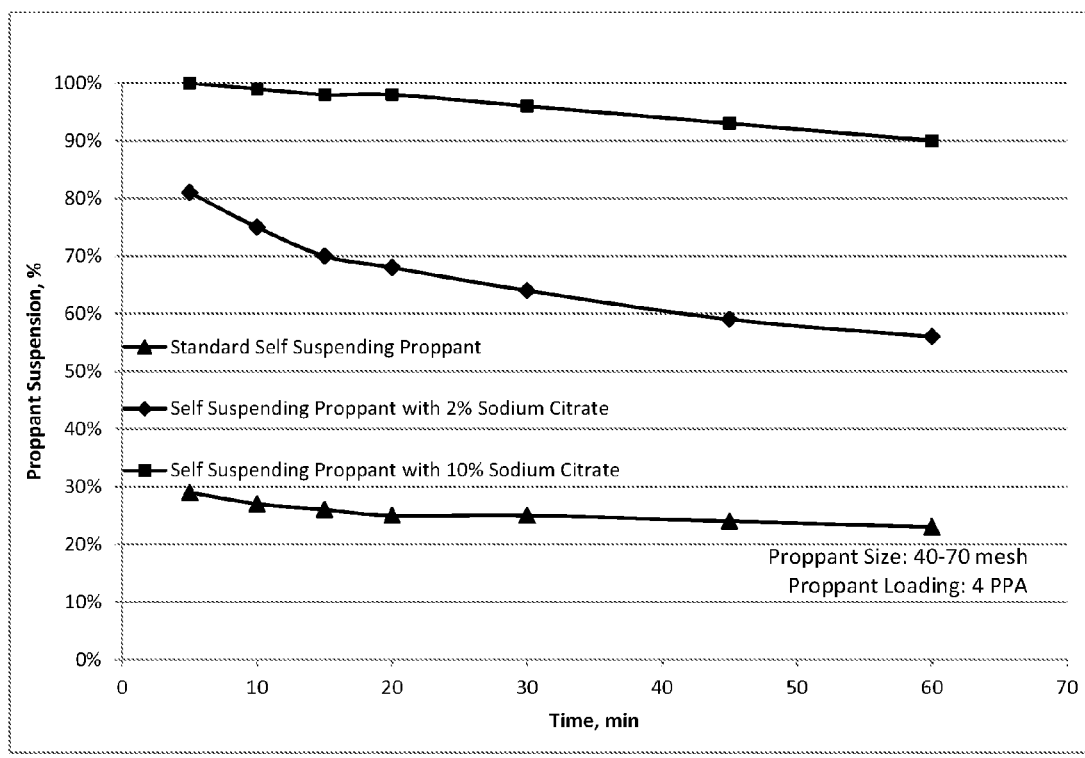
FIG. 2 represents the proppant suspension (in %) over time for standard self-suspending proppant and for self-suspending proppant according to the invention comprising 2% by weight sodium citrate and 10% by weight sodium citrate.

In FIG. 2, suspension tests were performed on standard self-suspending proppant which does not comprise any sequestering agent and on self-suspending proppant with 2% by weight and 10% by weight of trisodium citrate in an aqueous solution comprising 1% by weight of $CaCl_2$. The standard product without trisodium citrate exhibited poor suspension, the product with 2% trisodium citrate had good suspension characteristics, and the product with 10% trisodium citrate had even better suspension.

Figure 3:
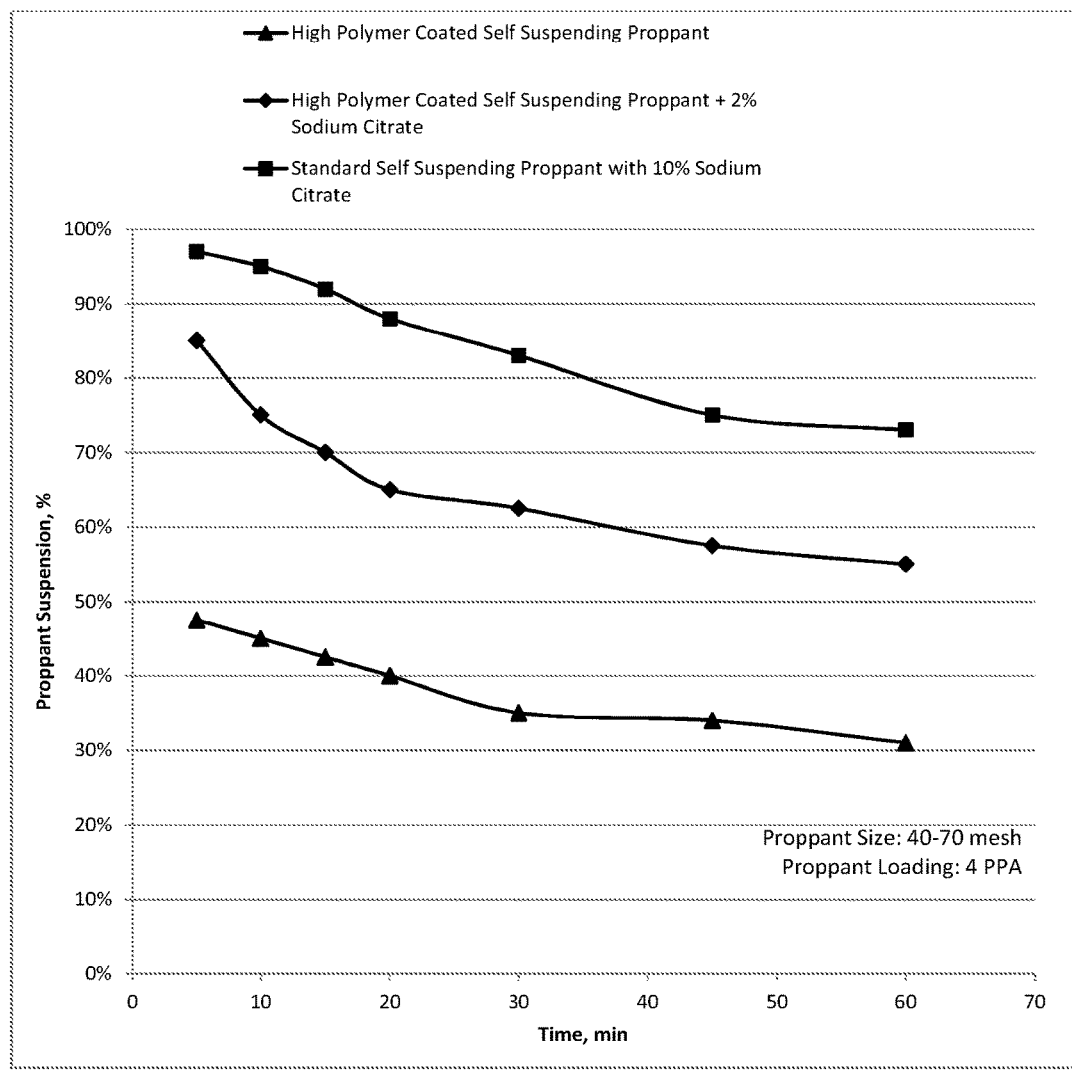
FIG. 3 represents the proppant suspension (in %) over time for a high polymer coated standard self-suspending proppant, for a high polymer coated self-suspending proppant comprising 2% by weight sodium citrate according to the invention and for self-suspending proppant according to the invention comprising 10% by weight sodium citrate.

In FIG. 3, proppant coated with a high level of polymer (2% by weight of proppant) was compared to proppant coated with 25% less polymer and 10% trisodium citrate in 2% $CaCl_2$ aqueous solutions and to proppant coated with a high level of polymer (2% by weight of proppant) and 2% trisodium citrate in an aqueous solution comprising 2% by weight of $CaCl_2$. The results showed that even with 25% less polymer, the trisodium citrate was able to double the performance of the standard product.

EXAMPLE 3: COMPARISON OF SEQUESTERING AGENTS IN SELF-SUSPENDING PROPPANT

In this example, trisodium citrate, tripotassium citrate and sodium gluconate have been used as sequestering agent. These different sequestering agents have been added at 1% by weight to coated proppant in an aqueous solution comprising 1% by weight of $CaCl_2$.

Figure 4:
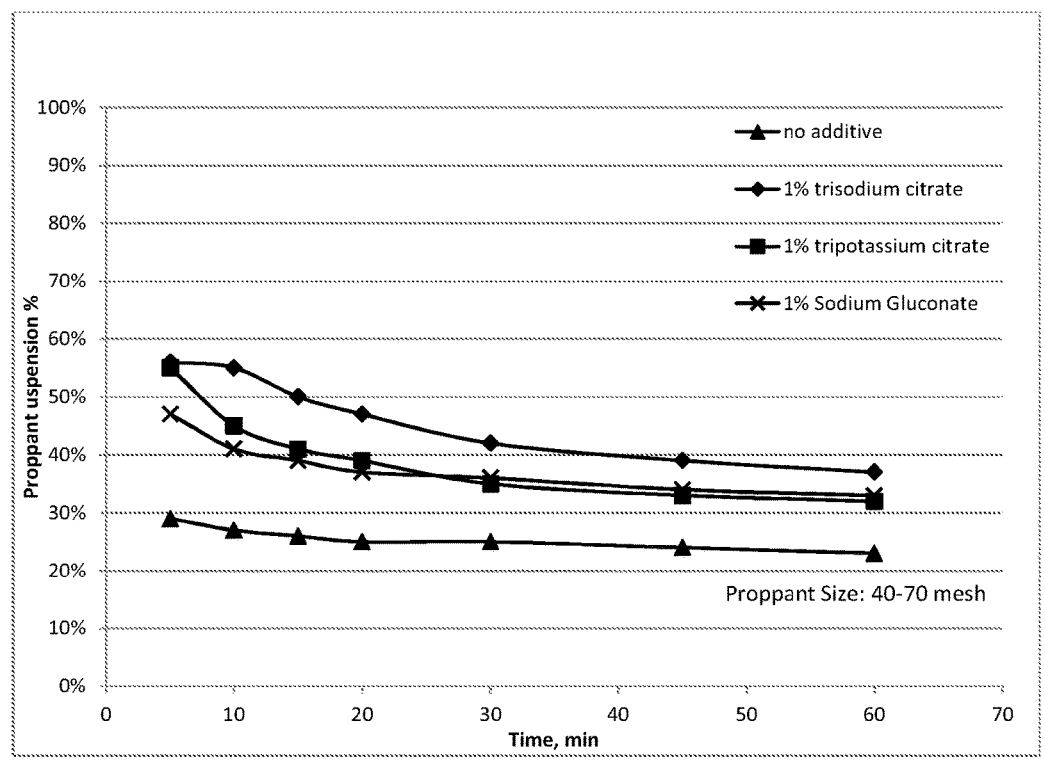
FIG. 4 represents the proppant suspension (in %) over time for standard self-suspending proppant and for self-suspending proppant according to the invention comprising trisodium citrate, tripotassium citrate or sodium gluconate at 1% by weight to coated proppant.

The results are shown in FIG. 4 which highlights a suspension improvement over proppant without sequestering agents.

EXAMPLE 4: EFFECT OF TRISODIUM CITRATE IN SELF-SUSPENDING PROPPANT IN $CaCl_2$ SOLUTIONS

In this example, trisodium citrate was used in aqueous solution comprising 0.5% and 1% of $CaCl_2$. The trisodium content ranged from 0.5% to 2% by weight of proppant.

Figure 5:
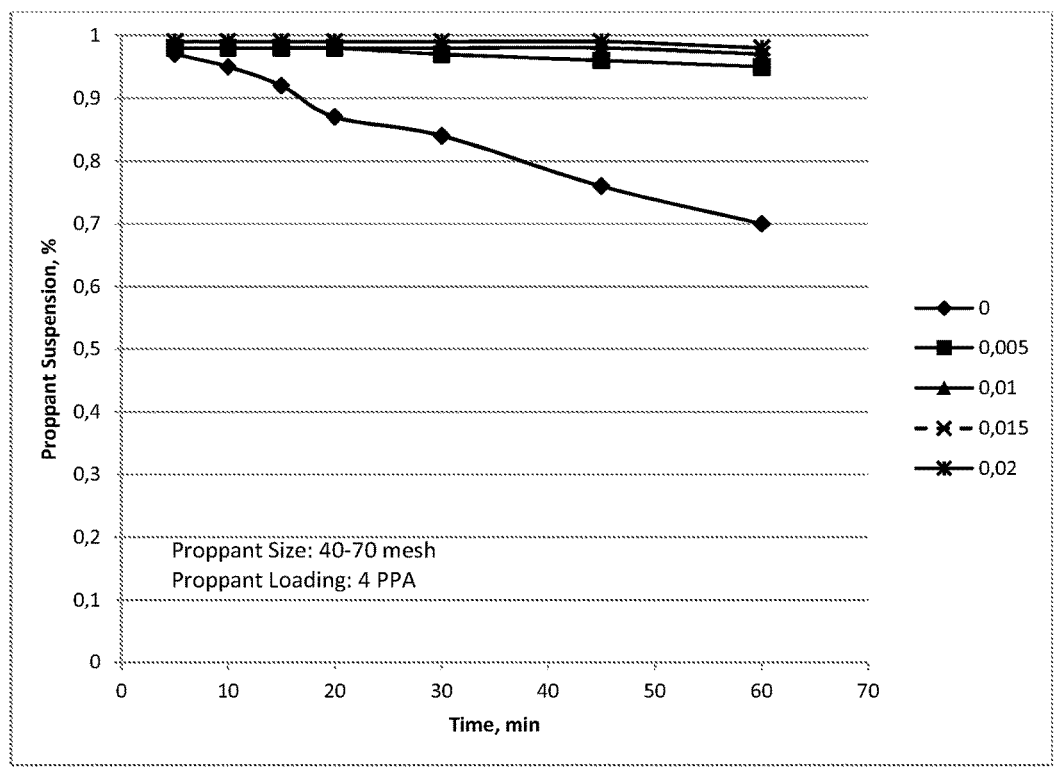
FIG. 5 represents the proppant suspension (in %) over time for self-suspending proppant according to the invention comprising from 0.5 to 2% by weight trisodium citrate in aqueous solution comprising 0.5% by weight of $CaCl_2$.
Figure 6:
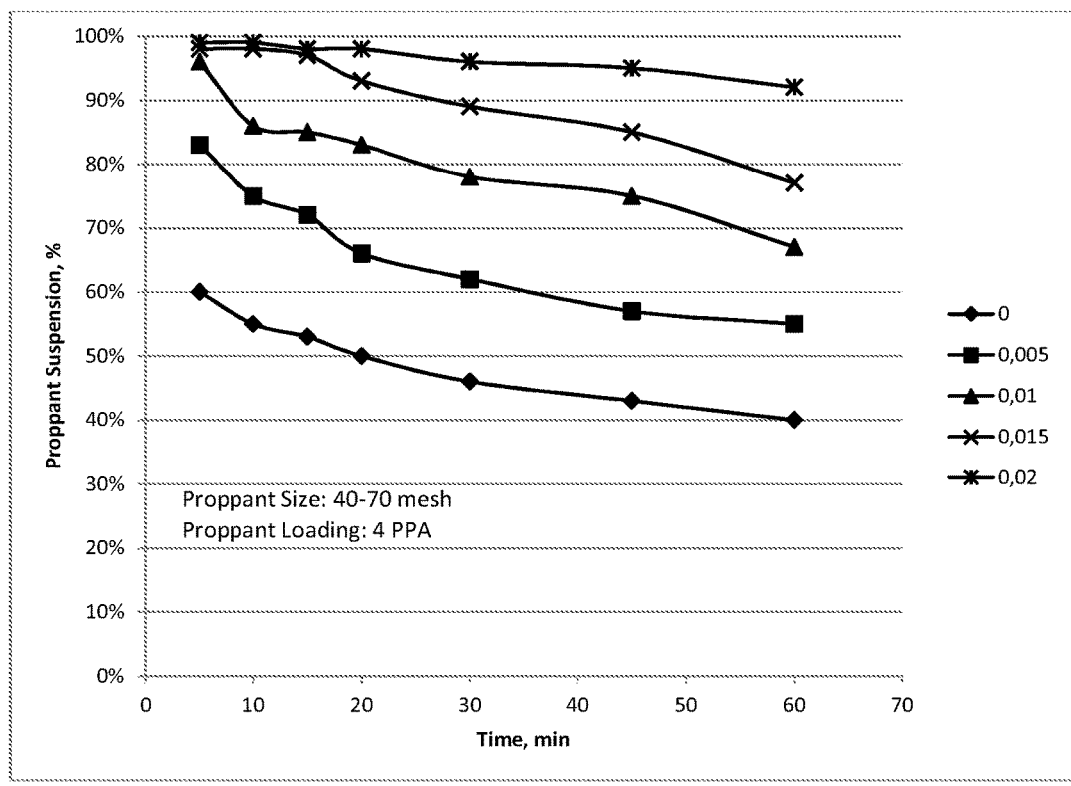
FIG. 6 represents the proppant suspension (in %) over time for self-suspending proppant according to the invention comprising from 0.5 to 2% by weight trisodium citrate in aqueous solution comprising 1% by weight of $CaCl_2$.

FIGS. 5 and 6 highlight that addition of trisodium citrate is beneficial to suspension whatever the $CaCl_2$ solution content.

The invention claimed is:

1. A proppant coated with:
    at least one water-soluble and/or water-swellable polymers; and
    at least one composition comprising at least one sequestering agent;
   wherein the sequestering agent is in the layer of water soluble and/or water-swellable polymer and/or in another layer; and
   wherein the sequestering agent is a sequestering agent of divalent cations of a brine solution.

2. The proppant according to claim 1 wherein the proppant is a silica sand.

3. The proppant according claim 1 wherein the content of water-soluble and/or water-swellable polymer coating is comprised between 0.25 to 3 weight percent of proppant.

4. The proppant according to claim 1 wherein the content of sequestering agent is comprised between 0.1 and 15 weight percent of proppant.

5. The proppant according to claim 1 wherein the sequestering agent is a citrate of alkali metal.

6. The proppant according to claim 1 further comprising at least one binder layer on the surface of the proppant.

7. The proppant according to claim 1 wherein the sequestering agent is a gluconate of alkali metal.

8. A process to obtain a proppant according to claim 1 comprising:
    1) providing a proppant;
    2) optionally applying at least one layer of a composition comprising at least one binder and optionally comprising at least one sequestering agent;
    3) applying at least one layer of a composition comprising at least one water-soluble and/or water-swellable polymer and optionally a sequestering agent;
    4) optionally, especially if no sequestering agent is comprised in the binder layer or in the layer of water-soluble and/or water-swellable polymer, applying a layer of at least one composition comprising at least one sequestering agent,
   wherein 3) and 4) can be repeated and can be carried out in any order.

9. The process according to claim 8 wherein application of the layer of water-soluble and/or water-swellable polymer is performed with a polymer in powder form or in water in oil emulsion form or a combination thereof.

10. The process according to claim 8, wherein a drying step is performed at the end of the process.

11. A hydraulic fracturing fluid comprising the proppant according to claim 1, wherein said hydraulic fracturing fluid comprises divalent cations in a proportion equal or greater to 0.1 weight %.

12. A process for hydraulic fracturing comprising carrying out said hydraulic fracturing using a hydraulic fracturing fluid comprising 0.1 weight percent of divalent cation and a proppant according to claim 1.

13. The process for hydraulic fracturing according to claim 12, wherein the divalent cation is a calcium or magnesium salt.

14. Process for hydraulic fracturing comprising the use of a self-suspending proppants according to claim 1, wherein the process is carried out with hydraulic fracturing fluid comprising divalent cations in a proportion equal or greater to 0.1 weight %.

* * * * *